United States Patent
Reed (10) Patent No.: US 10,230,296 B2
(45) Date of Patent: Mar. 12, 2019

(54) OUTPUT RIPPLE REDUCTION FOR POWER CONVERTERS

(71) Applicant: Express Imaging Systems, LLC, Renton, WA (US)

(72) Inventor: William G. Reed, Seattle, WA (US)

(73) Assignee: EXPRESS IMAGING SYSTEMS, LLC, Renton, WA (US)

(*) Notice: Subject to any disclaimer, the term of this patent is extended or adjusted under 35 U.S.C. 154(b) by 0 days.

(21) Appl. No.: 15/709,022

(22) Filed: Sep. 19, 2017

(65) Prior Publication Data

US 2018/0083539 A1    Mar. 22, 2018

Related U.S. Application Data

(60) Provisional application No. 62/397,709, filed on Sep. 21, 2016.

(51) Int. Cl.
*H02M 1/14* (2006.01)
*H05B 33/08* (2006.01)
(Continued)

(52) U.S. Cl.
CPC .......... *H02M 1/14* (2013.01); *H02M 3/335* (2013.01); *H02M 7/06* (2013.01);
(Continued)

(58) Field of Classification Search
CPC .......... H02M 1/12; H02M 1/126; H02M 1/14; H02M 3/156; H02M 3/335; H02M 3/33507

See application file for complete search history.

(56) References Cited

U.S. PATENT DOCUMENTS 1,920,948 A * 8/1933 Crouse ............... H02M 1/14
                                               333/181
2,240,050 A   4/1941 Nuebling
(Continued)

FOREIGN PATENT DOCUMENTS

CN   103162187 A    6/2013
DE   40 01 980 A1   8/1990
(Continued)

OTHER PUBLICATIONS

"Lcd Backlight I/O Ports and Power Protection Circuit Design," dated May 2, 2011, retrieved Jun. 10, 2011, from http://www.chipoy.info/gadgets/lcd-backlight-i-o-ports-and-power-pr . . . , 4 pages.
(Continued)

*Primary Examiner* — Fred E Finch, III
(74) *Attorney, Agent, or Firm* — Cozen O'Connor (57) ABSTRACT

Systems and methods for reducing low frequency (e.g., 100 Hz, 120 Hz) output ripple of a power converter which receives input power from an AC power source (e.g., AC mains). An output ripple reduction circuit is provided which is electrically coupled between an output of a power converter and a load (e.g., one or more LEDs). The output ripple reduction circuit comprises a transformer having a first winding and a second winding each wrapped around a core. The first winding has a first terminal electrically coupled to an output of the power converter and a second terminal coupled to a capacitor to form a first LC circuit. The second winding has a first terminal electrically coupled to a load and a second terminal coupled to the capacitor to form a second LC circuit.

33 Claims, 2 Drawing Sheets

(51) Int. Cl.
*H02M 3/335* (2006.01)
*H02M 7/06* (2006.01)
*H02M 1/12* (2006.01)
*H02M 1/00* (2006.01)

(52) U.S. Cl.
CPC ......... *H05B 33/0809* (2013.01); *H02M 1/126* (2013.01); *H02M 2001/007* (2013.01)

(56) References Cited

U.S. PATENT DOCUMENTS

| | | | |
|---|---|---|---|
| 2,745,055 A | 5/1956 | Woerdemann | |
| 3,374,396 A | 3/1968 | Bell et al. | |
| 3,745,440 A * | 7/1973 | Lord | H01F 27/385 363/17 |
| 3,825,815 A * | 7/1974 | Gyugyi | H02M 1/15 307/105 |
| 4,023,081 A * | 5/1977 | Murray | H02P 7/293 307/127 |
| 4,153,927 A | 5/1979 | Owens | |
| 4,237,377 A | 12/1980 | Sansum | |
| 4,274,133 A * | 6/1981 | Cuk | H02M 3/005 363/20 |
| 4,367,557 A * | 1/1983 | Stern | H04K 3/41 725/149 |
| 4,663,521 A | 5/1987 | Maile | |
| 4,760,356 A * | 7/1988 | Kempster | H02M 1/14 333/12 |
| 4,937,540 A * | 6/1990 | Carlson | H02M 1/14 333/12 |
| 4,988,922 A * | 1/1991 | Shoda | H01J 65/044 315/207 |
| 5,038,263 A * | 8/1991 | Marrero | H02M 1/14 323/222 |
| 5,086,379 A | 2/1992 | Denison et al. | |
| 5,160,202 A | 11/1992 | Légaré | |
| 5,161,107 A | 11/1992 | Mayeaux et al. | |
| 5,230,556 A | 7/1993 | Canty et al. | |
| 5,276,385 A | 1/1994 | Itoh et al. | |
| 5,343,121 A | 8/1994 | Terman et al. | |
| 5,349,505 A | 9/1994 | Poppenheimer | |
| 5,450,302 A | 9/1995 | Maase et al. | |
| 5,561,351 A | 10/1996 | Vrionis et al. | |
| 5,589,741 A | 12/1996 | Terman et al. | |
| 5,808,294 A | 9/1998 | Neumann | |
| 5,838,226 A | 11/1998 | Houggy et al. | |
| 5,869,960 A | 2/1999 | Brand | |
| 5,892,331 A | 4/1999 | Hollaway | |
| 5,892,335 A | 4/1999 | Archer | |
| 5,894,396 A | 4/1999 | Kim | |
| 5,936,362 A | 8/1999 | Alt et al. | |
| 5,986,907 A * | 11/1999 | Limpaecher | H02J 3/01 363/140 |
| 5,995,350 A | 11/1999 | Kopelman | |
| 6,008,999 A * | 12/1999 | Marrero | H02M 3/156 323/222 |
| 6,111,739 A | 8/2000 | Wu et al. | |
| 6,149,283 A | 11/2000 | Conway et al. | |
| 6,154,015 A | 11/2000 | Ichiba | |
| 6,160,353 A | 12/2000 | Mancuso | |
| 6,166,931 A * | 12/2000 | Mueller | H02M 1/14 363/46 |
| 6,198,233 B1 | 3/2001 | McConaughy | |
| 6,211,627 B1 | 4/2001 | Callahan | |
| 6,335,654 B1 | 1/2002 | Cole | |
| 6,347,045 B1 * | 2/2002 | Poon | H02M 1/126 363/39 |
| 6,377,191 B1 | 4/2002 | Takubo | |
| 6,612,720 B2 | 9/2003 | Beadle | |
| 6,674,060 B2 | 1/2004 | Antila | |
| 6,681,195 B1 | 1/2004 | Poland et al. | |
| 6,693,805 B1 * | 2/2004 | Steigerwald | H02J 1/02 323/259 |
| 6,746,274 B1 | 6/2004 | Verfuerth | |
| 6,753,842 B1 | 6/2004 | Williams et al. | |
| 6,828,911 B2 | 12/2004 | Jones et al. | |
| 6,841,947 B2 | 1/2005 | Berg-johansen | |
| 6,880,956 B2 | 4/2005 | Zhang | |
| 6,902,292 B2 | 6/2005 | Lai | |
| 6,937,115 B2 * | 8/2005 | Perreault | H03H 7/0115 333/172 |
| 6,985,827 B2 | 1/2006 | Williams et al. | |
| 7,019,276 B2 | 3/2006 | Cloutier et al. | |
| 7,066,622 B2 | 6/2006 | Alessio | |
| 7,081,722 B1 | 7/2006 | Huynh et al. | |
| 7,122,976 B1 | 10/2006 | Null et al. | |
| 7,188,967 B2 | 3/2007 | Dalton et al. | |
| 7,190,121 B2 | 3/2007 | Rose et al. | |
| 7,196,477 B2 | 3/2007 | Richmond | |
| 7,239,087 B2 | 7/2007 | Ball | |
| 7,252,385 B2 | 8/2007 | Engle et al. | |
| 7,258,464 B2 | 8/2007 | Morris et al. | |
| 7,270,441 B2 | 9/2007 | Fiene | |
| 7,281,820 B2 | 10/2007 | Bayat et al. | |
| 7,294,973 B2 | 11/2007 | Takahama et al. | |
| 7,314,291 B2 | 1/2008 | Tain et al. | |
| 7,317,403 B2 | 1/2008 | Grootes et al. | |
| 7,322,714 B2 | 1/2008 | Barnett et al. | |
| 7,330,568 B2 | 2/2008 | Nagaoka et al. | |
| 7,339,323 B2 | 3/2008 | Bucur | |
| 7,339,471 B1 | 3/2008 | Chan et al. | |
| 7,405,524 B2 | 7/2008 | Null et al. | |
| 7,438,440 B2 | 10/2008 | Dorogi | |
| 7,440,280 B2 | 10/2008 | Shuy | |
| 7,468,723 B1 | 12/2008 | Collins | |
| 7,524,089 B2 | 4/2009 | Park | |
| 7,538,499 B2 | 5/2009 | Ashdown | |
| 7,547,113 B2 | 6/2009 | Lee | |
| 7,559,674 B2 | 7/2009 | He et al. | |
| 7,564,198 B2 | 7/2009 | Yamamoto et al. | |
| 7,569,802 B1 | 8/2009 | Mullins | |
| 7,578,596 B2 | 8/2009 | Martin | |
| 7,578,597 B2 | 8/2009 | Hoover et al. | |
| 7,589,605 B2 * | 9/2009 | Perreault | H03H 7/427 333/12 |
| 7,623,042 B2 | 11/2009 | Huizenga | |
| 7,627,372 B2 | 12/2009 | Vaisnys et al. | |
| 7,631,324 B2 | 12/2009 | Buonasera et al. | |
| 7,633,463 B2 | 12/2009 | Negru | |
| 7,638,743 B2 | 12/2009 | Bartol et al. | |
| 7,665,862 B2 | 2/2010 | Villard | |
| 7,677,753 B1 | 3/2010 | Wills | |
| 7,688,002 B2 | 3/2010 | Ashdown et al. | |
| 7,688,222 B2 | 3/2010 | Peddie et al. | |
| 7,702,135 B2 | 4/2010 | Hill et al. | |
| 7,703,951 B2 | 4/2010 | Piepgras et al. | |
| 7,746,003 B2 | 6/2010 | Verfuerth et al. | |
| D621,410 S | 8/2010 | Verfuerth et al. | |
| D621,411 S | 8/2010 | Verfuerth et al. | |
| 7,798,669 B2 | 9/2010 | Trojanowski et al. | |
| 7,804,200 B2 | 9/2010 | Flaherty | |
| 7,828,463 B1 | 11/2010 | Willis | |
| 7,834,922 B2 | 11/2010 | Kurane | |
| 7,872,423 B2 | 1/2011 | Biery et al. | |
| 7,932,535 B2 | 4/2011 | Mahalingam et al. | |
| 7,940,191 B2 | 5/2011 | Hierzer | |
| 7,952,609 B2 | 5/2011 | Simerly et al. | |
| 7,960,919 B2 | 6/2011 | Furukawa | |
| 7,983,817 B2 | 7/2011 | Breed | |
| 7,985,005 B2 | 7/2011 | Alexander et al. | |
| 8,100,552 B2 | 1/2012 | Spero | |
| 8,115,537 B2 * | 2/2012 | Chung | H02M 1/15 327/551 |
| 8,118,456 B2 | 2/2012 | Reed et al. | |
| 8,143,769 B2 | 3/2012 | Li | |
| 8,174,212 B2 | 5/2012 | Tziony et al. | |
| 8,183,797 B2 | 5/2012 | McKinney | |
| 8,207,830 B2 | 6/2012 | Rutjes et al. | |
| 8,260,575 B2 | 9/2012 | Walters et al. | |
| 8,264,270 B2 * | 9/2012 | Chung | H02M 1/44 327/382 |
| 8,290,710 B2 | 10/2012 | Cleland et al. | |
| 8,305,783 B2 | 11/2012 | Rizzo | |

(56) References Cited

U.S. PATENT DOCUMENTS

| | | | |
|---|---|---|---|
| 8,324,840 B2 | 12/2012 | Shteynberg et al. |
| 8,334,640 B2 | 12/2012 | Reed et al. |
| 8,344,665 B2 | 1/2013 | Verfuerth et al. |
| 8,376,583 B2 | 2/2013 | Wang et al. |
| 8,378,563 B2 | 2/2013 | Reed et al. |
| 8,395,329 B2 | 3/2013 | Jutras et al. |
| 8,445,826 B2 | 5/2013 | Verfuerth |
| 8,450,670 B2 | 5/2013 | Verfuerth et al. |
| 8,457,793 B2 | 6/2013 | Golding et al. |
| 8,476,565 B2 | 7/2013 | Verfuerth |
| 8,508,137 B2 | 8/2013 | Reed |
| 8,541,950 B2 | 9/2013 | Reed |
| 8,586,902 B2 | 11/2013 | Verfuerth |
| 8,604,701 B2 | 12/2013 | Verfilerth et al. |
| 8,610,358 B2 | 12/2013 | Reed |
| 8,629,621 B2 * | 1/2014 | Reed .................. H05B 33/0809 315/185 R |
| 8,749,635 B2 | 6/2014 | Högasten et al. |
| 8,764,237 B2 | 7/2014 | Wang et al. |
| 8,779,340 B2 | 7/2014 | Verfuerth et al. |
| 8,779,686 B2 | 7/2014 | Jin |
| 8,810,138 B2 | 8/2014 | Reed |
| 8,866,392 B2 | 10/2014 | Chen |
| 8,866,582 B2 | 10/2014 | Verfuerth et al. |
| 8,872,964 B2 | 10/2014 | Reed et al. |
| 8,878,440 B2 | 11/2014 | Reed |
| 8,884,203 B2 | 11/2014 | Verfuerth et al. |
| 8,896,215 B2 | 11/2014 | Reed et al. |
| 8,901,825 B2 | 12/2014 | Reed |
| 8,921,751 B2 | 12/2014 | Verfuerth |
| 8,922,124 B2 | 12/2014 | Reed et al. |
| 8,926,138 B2 | 1/2015 | Reed et al. |
| 8,926,139 B2 | 1/2015 | Reed et al. |
| 8,975,827 B2 | 3/2015 | Chobot et al. |
| 8,987,992 B2 | 3/2015 | Reed |
| 9,002,522 B2 | 4/2015 | Mohan et al. |
| 9,024,545 B2 | 5/2015 | Bloch et al. |
| 9,084,310 B2 | 7/2015 | Bedell et al. |
| 9,119,270 B2 | 8/2015 | Chen et al. |
| 9,136,698 B2 | 9/2015 | Sharma et al. |
| 9,185,777 B2 | 11/2015 | Reed |
| 9,204,523 B2 | 12/2015 | Reed et al. |
| 9,210,751 B2 | 12/2015 | Reed |
| 9,210,759 B2 | 12/2015 | Reed |
| 9,288,873 B2 | 3/2016 | Reed |
| 9,414,449 B2 | 8/2016 | Reed |
| 9,450,347 B2 | 9/2016 | Kondou et al. |
| 9,462,662 B1 | 10/2016 | Reed |
| 9,466,443 B2 | 10/2016 | Reed |
| 9,693,433 B2 | 6/2017 | Reed et al. |
| 9,713,228 B2 | 7/2017 | Reed |
| 9,781,797 B2 | 10/2017 | Reed |
| 9,801,248 B2 | 10/2017 | Reed et al. |
| 9,825,544 B2 * | 11/2017 | Marrero ............ H02M 3/33546 |
| 2002/0084767 A1 | 7/2002 | Arai |
| 2003/0016143 A1 | 1/2003 | Ghazarian |
| 2003/0184672 A1 | 10/2003 | Wu et al. |
| 2004/0192227 A1 | 9/2004 | Beach et al. |
| 2005/0117344 A1 | 6/2005 | Bucher et al. |
| 2005/0174762 A1 | 8/2005 | Fogerlic |
| 2005/0179404 A1 | 8/2005 | Veskovic et al. |
| 2005/0231133 A1 | 10/2005 | Lys |
| 2006/0014118 A1 | 1/2006 | Utama |
| 2006/0055337 A1 * | 3/2006 | Wey .................. H05B 41/2825 315/200 R |
| 2006/0066264 A1 | 3/2006 | Ishigaki et al. |
| 2006/0098440 A1 | 5/2006 | Allen |
| 2006/0133079 A1 | 6/2006 | Callahan |
| 2006/0146652 A1 | 7/2006 | Huizi et al. |
| 2006/0208667 A1 | 9/2006 | Lys et al. |
| 2007/0032990 A1 | 2/2007 | Williams et al. |
| 2007/0102033 A1 | 5/2007 | Petrocy |
| 2007/0164689 A1 | 7/2007 | Suzuki |
| 2007/0224461 A1 | 9/2007 | Oh |
| 2007/0225933 A1 | 9/2007 | Shimomura |
| 2008/0018261 A1 | 1/2008 | Kastner |
| 2008/0025020 A1 | 1/2008 | Kolb |
| 2008/0043106 A1 | 2/2008 | Hassapis et al. |
| 2008/0062687 A1 | 3/2008 | Behar et al. |
| 2008/0130304 A1 | 6/2008 | Rash et al. |
| 2008/0215279 A1 | 9/2008 | Salsbury et al. |
| 2008/0224623 A1 | 9/2008 | Yu |
| 2008/0232116 A1 | 9/2008 | Kim |
| 2008/0248837 A1 | 10/2008 | Kunkel |
| 2008/0266839 A1 | 10/2008 | Claypool et al. |
| 2009/0046151 A1 | 2/2009 | Nagaoka et al. |
| 2009/0058320 A1 | 3/2009 | Chou et al. |
| 2009/0153062 A1 | 6/2009 | Guo et al. |
| 2009/0160358 A1 | 6/2009 | Leiderman |
| 2009/0161356 A1 | 6/2009 | Negley et al. |
| 2009/0167203 A1 | 7/2009 | Dahlman et al. |
| 2009/0195179 A1 | 8/2009 | Joseph et al. |
| 2009/0230883 A1 | 9/2009 | Haug |
| 2009/0235208 A1 | 9/2009 | Nakayama et al. |
| 2009/0261735 A1 | 10/2009 | Sibalich et al. |
| 2009/0268023 A1 | 10/2009 | Hsieh |
| 2009/0273290 A1 | 11/2009 | Ziegenfuss |
| 2009/0278479 A1 | 11/2009 | Planter et al. |
| 2010/0001652 A1 | 1/2010 | Damsleth |
| 2010/0052557 A1 | 3/2010 | Van Der Veen et al. |
| 2010/0096460 A1 | 4/2010 | Carlson et al. |
| 2010/0123403 A1 | 5/2010 | Reed |
| 2010/0164406 A1 | 7/2010 | Kost et al. |
| 2010/0171442 A1 | 7/2010 | Draper et al. |
| 2010/0237711 A1 | 9/2010 | Parsons |
| 2010/0244708 A1 | 9/2010 | Cheung et al. |
| 2010/0259193 A1 | 10/2010 | Umezawa et al. |
| 2010/0270945 A1 | 10/2010 | Chang et al. |
| 2010/0271802 A1 | 10/2010 | Recker et al. |
| 2010/0309310 A1 | 12/2010 | Albright |
| 2010/0328946 A1 | 12/2010 | Borkar et al. |
| 2011/0001626 A1 | 1/2011 | Yip et al. |
| 2011/0006703 A1 | 1/2011 | Wu et al. |
| 2011/0026264 A1 | 2/2011 | Reed et al. |
| 2011/0026282 A1 * | 2/2011 | Chapman .................. H02J 3/38 363/65 |
| 2011/0204845 A1 | 8/2011 | Paparo et al. |
| 2011/0215724 A1 | 9/2011 | Chakravarty et al. |
| 2011/0215731 A1 | 9/2011 | Jeong et al. |
| 2011/0221346 A1 | 9/2011 | Lee et al. |
| 2011/0222195 A1 | 9/2011 | Benoit et al. |
| 2011/0248812 A1 | 10/2011 | Hu et al. |
| 2011/0251751 A1 | 10/2011 | Knight |
| 2011/0282468 A1 | 11/2011 | Ashdown |
| 2011/0310605 A1 | 12/2011 | Renn et al. |
| 2012/0001566 A1 | 1/2012 | Josefowicz et al. |
| 2012/0019971 A1 | 1/2012 | Flaherty et al. |
| 2012/0038490 A1 | 2/2012 | Verfuerth |
| 2012/0098439 A1 | 4/2012 | Recker et al. |
| 2012/0119669 A1 | 5/2012 | Melanson et al. |
| 2012/0119682 A1 | 5/2012 | Warton |
| 2012/0143383 A1 | 6/2012 | Cooperrider et al. |
| 2012/0146525 A1 * | 6/2012 | Hui .................. H05B 33/0809 315/200 R |
| 2012/0153854 A1 | 6/2012 | Setomoto et al. |
| 2012/0169053 A1 | 7/2012 | Tchoryk, Jr. et al. |
| 2012/0169239 A1 | 7/2012 | Chen et al. |
| 2012/0181935 A1 | 7/2012 | Velazquez |
| 2012/0194054 A1 | 8/2012 | Johnston et al. |
| 2012/0209755 A1 | 8/2012 | Verfuerth et al. |
| 2012/0221154 A1 | 8/2012 | Runge |
| 2012/0224363 A1 | 9/2012 | Van De Ven |
| 2012/0230584 A1 | 9/2012 | Kubo et al. |
| 2012/0242254 A1 | 9/2012 | Kim et al. |
| 2013/0033183 A1 | 2/2013 | Verfuerth et al. |
| 2013/0049613 A1 * | 2/2013 | Reed .................. H05B 33/0809 315/185 R |
| 2013/0126715 A1 | 5/2013 | Flaherty |
| 2013/0131882 A1 | 5/2013 | Verfuerth et al. |
| 2013/0141000 A1 | 6/2013 | Wei et al. |
| 2013/0154488 A1 | 6/2013 | Sadwick et al. |
| 2013/0163243 A1 | 6/2013 | Reed |
| 2013/0193857 A1 | 8/2013 | Tlachac et al. |
| 2013/0229518 A1 | 9/2013 | Reed et al. |

(56) References Cited

U.S. PATENT DOCUMENTS

| | | |
|---|---|---|
| 2013/0235202 A1 | 9/2013 | Nagaoka et al. |
| 2013/0249429 A1 | 9/2013 | Woytowitz et al. |
| 2013/0249479 A1 | 9/2013 | Partovi |
| 2013/0340353 A1 | 12/2013 | Whiting et al. |
| 2014/0001961 A1 | 1/2014 | Anderson et al. |
| 2014/0028198 A1 | 1/2014 | Reed et al. |
| 2014/0055990 A1 | 2/2014 | Reed |
| 2014/0070964 A1 | 3/2014 | Rupprath et al. |
| 2014/0078308 A1 | 3/2014 | Verfuerth |
| 2014/0097759 A1 | 4/2014 | Verfuerth et al. |
| 2014/0159585 A1 | 6/2014 | Reed |
| 2014/0166447 A1 | 6/2014 | Thea et al. |
| 2014/0203714 A1 | 7/2014 | Zhang et al. |
| 2014/0244044 A1 | 8/2014 | Davis et al. |
| 2014/0265894 A1 | 9/2014 | Weaver |
| 2014/0265897 A1 | 9/2014 | Taipale et al. |
| 2014/0313719 A1 | 10/2014 | Wang et al. |
| 2015/0015716 A1 | 1/2015 | Reed et al. |
| 2015/0194811 A1* | 7/2015 | Mao ................ H02J 7/025 307/104 |
| 2015/0208479 A1 | 7/2015 | Radermacher et al. |
| 2015/0280782 A1 | 10/2015 | Airbinger et al. |
| 2015/0312983 A1 | 10/2015 | Hu et al. |
| 2016/0021713 A1 | 1/2016 | Reed |
| 2016/0150622 A1 | 5/2016 | Flinsenberg et al. |
| 2016/0234899 A1 | 8/2016 | Reed et al. |
| 2017/0055324 A1 | 2/2017 | Reed |
| 2017/0141565 A1 | 5/2017 | White |
| 2017/0311424 A1 | 10/2017 | Vendetti et al. |

FOREIGN PATENT DOCUMENTS

| | | |
|---|---|---|
| EP | 1 734 795 A1 | 12/2006 |
| EP | 2 559 937 A1 | 2/2013 |
| EP | 1 459 600 B1 | 2/2014 |
| FR | 2 883 306 A1 | 9/2006 |
| JP | 6-335241 A | 12/1994 |
| JP | 2001-333420 A | 11/2001 |
| JP | 2004-279668 A | 10/2004 |
| JP | 2004-320024 A | 11/2004 |
| JP | 2004-349065 A | 12/2004 |
| JP | 2005-93171 A | 4/2005 |
| JP | 2005-198238 A | 7/2005 |
| JP | 2005-310997 A | 11/2005 |
| JP | 2006-179672 A | 7/2006 |
| JP | 2006-244711 A | 9/2006 |
| JP | 2008-59811 A | 3/2008 |
| JP | 2008-509538 A | 3/2008 |
| JP | 2008-130523 A | 6/2008 |
| JP | 2008-159483 A | 7/2008 |
| JP | 2008-177144 A | 7/2008 |
| JP | 2008-529177 A | 7/2008 |
| JP | 2008-535279 A | 8/2008 |
| JP | 2010-504628 A | 2/2010 |
| KR | 10-2005-0078403 A | 8/2005 |
| KR | 10-2006-0071869 A | 6/2006 |
| KR | 10-2006-0086254 A | 7/2006 |
| KR | 10-2008-0100140 A | 11/2008 |
| KR | 10-2009-0042400 A | 4/2009 |
| KR | 10-0935736 B1 | 1/2010 |
| KR | 20-2010-0007230 U | 7/2010 |
| KR | 10-1001276 B1 | 12/2010 |
| KR | 10-1044224 B1 | 6/2011 |
| KR | 10-1150876 B1 | 5/2012 |
| WO | 02/076068 A1 | 9/2002 |
| WO | 03/056882 A1 | 7/2003 |
| WO | 2005/003625 A1 | 1/2005 |
| WO | 2006/057866 A2 | 6/2006 |
| WO | 2007/023454 A1 | 3/2007 |
| WO | 2007/036873 A2 | 4/2007 |
| WO | 2008/030450 A2 | 3/2008 |
| WO | 2008/034242 A1 | 3/2008 |
| WO | 2009/040703 A2 | 4/2009 |
| WO | 2010/086757 A1 | 8/2010 |
| WO | 2010/133719 A1 | 11/2010 |
| WO | 2011/063302 A2 | 5/2011 |
| WO | 2011/129309 A1 | 10/2011 |
| WO | 2012/006710 A1 | 1/2012 |
| WO | 2012/142115 A2 | 10/2012 |
| WO | 2013/074900 A1 | 5/2013 |
| WO | 2014/018773 A1 | 1/2014 |
| WO | 2014/039683 A1 | 3/2014 |
| WO | 2014/078854 A1 | 5/2014 |

OTHER PUBLICATIONS

Amendment, filed Jun. 23, 2017, for U.S. Appl. No. 15/206,019, Reed, "High Efficiency Power Controller for Luminaire," 9 pages.

Corrected Notice of Allowance, dated Aug. 12, 2015, and Notice of Allowance, dated Jul. 31, 2015 for Reed et al., "Remotely Adjustable Solid-State Lamp," U.S. Appl. No. 13/875,130, 11 pages.

EE Herald, "Devices to protect High brightness LED from ESD," dated Mar. 16, 2009, retrieved Jun. 10, 2011, from http://www.eeherald.com/section/new-products/np100779.html, 1 page.

European Office Action, dated Aug. 11, 2017, for European Application No. 13 823 055.2-1802, 4 pages.

Extended European Search Report dated Jan. 4, 2016, for corresponding EP Application No. 13823055.2-1802, 7 pages.

Extended European Search Report dated Oct. 21, 2015, for corresponding EP Application No. 13835001.2-1802, 7 pages.

Extended European Search Report, dated Apr. 11, 2016, for corresponding European Application No. 16152644.7, 8 pages.

Extended European Search Report, dated Aug. 13, 2014, for corresponding European Application No. 09826926.9, 8 pages.

Extended European Search Report, dated May 3, 2016, for corresponding European Application No. 12771286.7, 9 pages.

Extended European Search Report, dated Oct. 15, 2015, for corresponding European Application No. 12825132.9-1802, 5 pages.

Extended European Search Report, dated Sep. 28, 2015, for corresponding European Application No. 12850159.0-1802, 6 pages.

Fairchild Semiconductor, "LED Application Design Guide Using Half-Bridge LLC Resonant Converter for 100W Street Lighting," AN-9729, Fairchild Semiconductor Corporation, Rev. 1.0.0, Mar. 22, 2011, 17 pages.

Huang, "Designing an LLC Resonant Half-Bridge Power Converter," 2010 Texas Instruments Power Supply Design Seminar, SEM1900, Topic 3, TI Literature No. SLUP263, Copyright 2010, 2011, Texas Instruments Incorporated, 28 pages.

International Search Report and Written Opinion, dated May 7, 2015, for International Application No. PCT/US2015/013512, 15 pages.

International Search Report dated Nov. 11, 2014, for International Application No. PCT/US2014/047867, 3 pages.

International Search Report, dated Dec. 13, 2010 for PCT/US2010/035649, 3 pages.

International Search Report, dated Dec. 15, 2010 for PCT/US2010/035658, 3 pages.

International Search Report, dated Dec. 28, 2010 for PCT/US2010/035651, 3 pages.

International Search Report, dated Dec. 30, 2013 for PCT/US2013/058266, 3 pages.

International Search Report, dated Feb. 27, 2013, for PCT/US2012/065476, 3 pages.

International Search Report, dated Jan. 14, 2013, for PCT/US2012/052009, 3 pages.

International Search Report, dated Jul. 9, 2009 for PCT/US2009/043171, 5 pages.

International Search Report, dated Jun. 21, 2010, for PCT/US2009/064625, 3 pages.

International Search Report, dated Nov. 19, 2013 for PCT/US2013/052092, 4 pages.

International Search Report, dated Oct. 8, 2012 for PCT/US2012/033059, 3 pages.

Japanese Office Action, dated Jan. 6, 2015, for corresponding Japanese Application No. 2011-536564, 6 pages.

(56) References Cited

OTHER PUBLICATIONS

Kadirvel et al., "Self-Powered, Ambient Light Sensor Using bq25504," Texas Instruments, Application Report, SLUA629—Jan. 2012, 6 pages.
Korean Office Action with English Translation, dated May 16, 2016, for corresponding KR Application No. 10-2011-7014088, 22 pages.
Korean Office Action with English Translation, dated Nov. 18, 2015, for corresponding KR Application No. 10-2011-7014088, 14 pages.
Littelfuse, "Application Note: Protecting LEDs in Product Designs," 2009, 2 pages.
Notice of Allowance dated Apr. 11, 2014, for Reed, "Apparatus and Method of Energy Efficient Illumination," U.S. Appl. No. 13/943,537, 9 pages.
Notice of Allowance dated Apr. 11, 2016, for Reed, "High Efficiency Power Controller for Luminaire," U.S. Appl. No. 14/546,354, 5 pages.
Notice of Allowance dated Apr. 12, 2013, for Reed, "Apparatus and Method of Energy Efficient Illumination," U.S. Appl. No. 12/784,093, 9 pages.
Notice of Allowance dated Apr. 23, 2015, for Reed, "Electronic Control to Regulate Power for Solid-State Thereof," U.S. Appl. No. 12/619,535, 8 pages.
Notice of Allowance dated Apr. 27, 2015, for Reed et al., "Apparatus and Method of Operating a Luminaire," U.S. Appl. No. 13/558,191, 8 pages.
Notice of Allowance dated Aug. 29, 2014, for Reed et al., "Adjustable Solid-State Lamp With Security Features," U.S. Appl. No. 13/679,687, 9 pages.
Notice of Allowance dated Aug. 4, 2015, for Reed, "Solid State Lighting, Drive Circuit and Method of Driving Same," U.S. Appl. No. 13/875,000, 9 pages.
Notice of Allowance dated Feb. 25, 2016, for Reed, "Adjustable Output Solid-State Lighting Device," U.S. Appl. No. 13/707,123, 9 pages.
Notice Of Allowance dated Jul. 1, 2014, for Reed, "Luminaire With Atmospheric Electrical Activity Detection and Visual Alert Capabilities," U.S. Appl. No. 13/786,114, 9 pages.
Notice of Allowance dated Jul. 18, 2016, for Reed et al., "Systems and Methods That Employ Object Recognition," U.S. Appl. No. 13/411,321, 15 pages.
Notice of Allowance dated Jul. 30, 2014, for Reed, "Apparatus and Method of Energy Efficient Illumination Using Received Signals," U.S. Appl. No. 13/085,301, 5 pages.
Notice of Allowance dated Jul. 7, 2014, for Reed et al., "Apparatus and Method for Schedule Based Operation of a Luminaire," U.S. Appl. No. 13/604,327, 8 pages.
Notice of Allowance dated Jun. 19, 2015, for Reed et al., "Apparatus and Method for Schedule Based Operation of a Luminaire" U.S. Appl. No. 14/552,274, 9 pages.
Notice Of Allowance dated Jun. 20, 2014, for Reed et al., "Long-Range Motion Detection for Illumination Control," U.S. Appl. No. 12/784,080, 7 pages.
Notice of Allowance dated Mar. 16, 2017, for U.S. Appl. No. 14/552,274, Reed et al., "Apparatus and Method for Schedule Based Operation of a Luminaire," 9 pages.
Notice of Allowance dated Mar. 24, 2017, for Reed, "Apparatus and Method of Energy Efficient Illumination Using Received Signals," U.S. Appl. No. 14/557,275, 23 pages.
Notice of Allowance dated May 23, 2013, for Reed, "Apparatus and Method of Energy Efficient Illumination," U.S. Appl. No. 12/784,091, 6 pages.
Notice of Allowance dated Nov. 18, 2015, for Reed, "Luminaire With Switch-Mode Converter Power Monitoring," U.S. Appl. No. 14/074,166, 9 pages.
Notice of Allowance dated Nov. 5, 2014, for Reed, "Apparatus and Method of Energy Efficient Illumination," U.S. Appl. No. 14/329,508, 10 pages.
Notice of Allowance dated Nov. 6, 2015, for Reed, "Systems, Methods, and Apparatuses for Using a High Current Switching Device as a Logic Level Sensor," U.S. Appl. No. 14/179,737, 28 pages.
Notice of Allowance dated Sep. 12, 2013, for Reed, "Electrostatic Discharge Protection for Luminaire," U.S. Appl. No. 13/212,074, 6 pages.
Notice of Allowance dated Sep. 30, 2013, for Reed, "Resonant Network for Reduction of Flicker Perception in Solid State Lighting Systems," U.S. Appl. No. 13/592,590, 9 pages.
Notice of Allowance, dated Oct. 14, 2011, for Reed et al., "Low-Profile Pathway Illumination System," U.S. Appl. No. 12/437,472, 9 pages.
Notice of Allowance, dated Jul. 24, 2017, for U.S. Appl. No. 15/206,019, Reed, "High Efficiency Power Controller for Luminaire," 9 pages.
Notice of Allowance, dated Jun. 14, 2017, for U.S. Appl. No. 14/557,275, Reed, "Apparatus and Method of Energy Efficient Illumination Using Received Signals," 2 pages.
Notice of Allowance, dated Jun. 22, 2017, for U.S. Appl. No. 14/816,754, Reed et al., "Apparatus and Method of Operating a Luminaire ," 11 pages.
Notice of Allowance, dated Nov. 6, 2017, for U.S. Appl. No. 15/496,985, Vendetti et al., "Luminaire Dimming Module Uses 3 Contact Nema Photocontrol Socket," 8 pages.
Office Action dated Apr. 15, 2016, for Reed, "Solid State Hospitality Lamp," U.S. Appl. No. 13/973,696, 11 pages.
Office Action dated Apr. 21, 2015, for Reed et al., "Remotely Adjustable Solid-State Lamp," U.S. Appl. No. 13/875,130, 10 pages.
Office Action dated Apr. 23, 2014, for Reed, "Apparatus and Method of Energy Efficient Illumination Using Received Signals," U.S. Appl. No. 13/085,301, 12 pages.
Office Action dated Apr. 24, 2013, for Reed, "Apparatus and Method of Energy Efficient Illumination," U.S. Appl. No. 12/784,091, 12 pages.
Office Action dated Aug. 14, 2014, for Reed, "Electronic Control to Regulate Power for Solid-State Lighting and Methods Thereof," U.S. Appl. No. 12/619,535, 16 pages.
Office Action dated Aug. 23, 2016, for Reed, "Apparatus and Method of Energy Efficient Illumination Using Received Signals," U.S. Appl. No. 14/557,275, 23 pages.
Office Action dated Aug. 25, 2014, for Reed et al., "Systems and Methods That Employ Object Recognition," U.S. Appl. No. 13/411,321, 35 pages.
Office Action dated Aug. 28, 2014, for Reed, "Apparatus and Method of Energy Efficient Illumination," U.S. Appl. No. 14/329,508, 8 pages.
Office Action dated Dec. 21, 2012, for Reed et al., "Long-Range Motion Detection for Illumination Control," U.S. Appl. No. 12/784,080, 26 pages.
Office Action dated Dec. 22, 2014, for Reed et al., "Apparatus and Method of Operating a Luminaire," U.S. Appl. No. 13/558,191, 17 pages.
Office Action dated Dec. 5, 2012, for Reed, "Apparatus and Method of Energy Efficient Illumination," U.S. Appl. No. 12/784,091, 18 pages.
Office Action dated Dec. 5, 2012, for Reed, "Apparatus and Method of Energy Efficient Illumination," U.S. Appl. No. 12/784,093, 13 pages.
Office Action dated Dec. 7, 2015, for Reed et al., "Systems and Methods That Employ Object Recognition," U.S. Appl. No. 13/411,321, 47 pages.
Office Action dated Feb. 17, 2017, for U.S. Appl. No. 14/939,856, Reed et al., "Luminaire With Adjustable Illumination Pattern," 13 pages.
Office Action dated Feb. 27, 2014, for Reed et al., "Adjustable Output Solid-State Lamp With Security Features," U.S. Appl. No. 13/679,687, 11 pages.
Office Action dated Feb. 28, 2013, for Reed, "Electronic Control to Regulate Power for Solid-State Lighting and Methods Thereof," U.S. Appl. No. 12/619,535, 17 pages.

(56) References Cited

OTHER PUBLICATIONS

Office Action dated Feb. 9, 2015, for Reed et al., "Systems and Methods That Employ Object Recognition," U.S. Appl. No. 13/411,321, 40 pages.
Office Action dated Jan. 18, 2017 for Reed, "Electronic Control to Regulate Power for Solid-State Lighting and Methods Thereof," U.S. Appl. No. 14/806,500, 18 pages.
Office Action dated Jan. 2, 2015, for Reed, "Adjustable Output Solid-State Lighting Device," U.S. Appl. No. 13/707,123, 24 pages.
Office Action dated Jan. 30, 2014, for Reed et al., "Long-Range Motion Detection for Illumination Control," U.S. Appl. No. 12/784,080, 26 pages.
Office Action dated Jul. 22, 2013, for Reed et al., "Long-Range Motion Detection for Illumination Control," U.S. Appl. No. 12/784,080, 29 pages.
Office Action dated Jul. 30, 2013, for Reed, "Electronic Control to Regulate Power for Solid-State Lighting and Methods Thereof," U.S. Appl. No. 12/619,535, 15 pages.
Office Action dated Mar. 15, 2013 for Reed et al., "Electrostatic Discharge Protection for Luminaire," U.S. Appl. No. 13/212,074, 11 pages.
Office Action dated Mar. 2, 2015, for Reed et al., "Apparatus and Method for Schedule Based Operations of a Luminaire," U.S. Appl. No. 14/552,274, 7 pages.
Office Action dated Mar. 23, 2017, for U.S. Appl. No. 15/206,019, Reed, "High Efficiency Power Controller for Luminaire," 22 pages.
Office Action dated Mar. 26, 2014, for Reed et al., "Apparatus and Method for Schedule Based Operation of a Luminaire," U.S. Appl. No. 13/604,327, 10 pages.
Office Action dated Mar. 26, 2014, for Reed, "Electronic Control to Regulate Power for Solid-State Lighting and Methods Thereof," U.S. Appl. No. 12/619,535, 16 pages.
Office Action dated Mar. 4, 2016, for Reed et al., "Long-Range Motion Detection for Illumination Control," U.S. Appl. No. 14/500,512, 18 pages.
Office Action dated May 9, 2016 for Reed, "Electronic Control to Regulate Power for Solid-State Lighting and Methods Thereof," U.S. Appl. No. 14/806,500, 18 pages.
Office Action dated Nov. 27, 2013, for Reed, "Apparatus and Method of Energy Efficient Illumination," U.S. Appl. No. 13/943,537, 8 pages.
Office Action dated Oct. 1, 2013, for Reed, "Apparatus and Method of Energy Efficient Illumination Using Received Signals," U.S. Appl. No. 13/085,301, 11 pages.
Office Action dated Oct. 5, 2015, for Reed, "Adjustable Output Solid-State Lighting Device," U.S. Appl. No. 13/707,123, 26 pages.
Office Action dated Sep. 10, 2015, for Reed, "High Efficiency Power Controller for Luminaire," U.S. Appl. No. 14/546,354, 32 pages.
Office Action dated Sep. 17, 2015, for Reed et al., "Long-Range Motion Detection for Illumination Control," U.S. Appl. No. 14/500,512, 35 pages.
Office Action dated Sep. 19, 2016, for U.S. Appl. No. 14/552,274, Reed et al., "Apparatus and Method for Schedule Based Operation of a Luminaire," 9 pages.
Office Action dated Sep. 6, 2016 for Reed, "Electronic Control to Regulate Power for Solid-State Lighting and Methods Thereof," U.S. Appl. No. 14/806,500, 18 pages.
Office Action, dated May 5, 2011, for Reed et al., "Low-Profile Pathway Illumination System," U.S. Appl. No. 12/437,472, 24 pages.
Panasonic Electronic Components, "LED Lighting Solutions," 2009, 6 pages.
Poplawski, "Exploring Flicker & LEDs," 2010 DOE SSL Market Introduction Workshop, U.S. Department of Energy, Jul. 22, 2010, 16 pages.
Reed et al., "Adjustable Output Solid-State Lamp With Security Features," Amendment filed Jun. 24, 2014, for U.S. Appl. No. 13/679,687, 11 pages.
Reed et al., "Adjustable Output Solid-State Lamp With Security Features," U.S. Appl. No. 61/561,616, filed Nov. 18, 2011, 33 pages.
Reed et al., "Apparatus and Method for Schedule Based Operation of a Luminaire" Amendment filed Dec. 7, 2016, for U.S. Appl. No. 14/552,274, 11 pages.
Reed et al., "Apparatus and Method for Schedule Based Operation of a Luminaire" Amendment filed Jun. 1, 2015, for U.S. Appl. No. 14/552,274, 14 pages.
Reed et al., "Apparatus and Method for Schedule Based Operation of a Luminaire," Amendment filed Jun. 7, 2016, for U.S. Appl. No. 14/552,274, 14 pages.
Reed et al., "Apparatus and Method for Schedule Based Operation of a Luminaire," Amendment filed Jun. 24, 2014, for U.S. Appl. No. 13/604,327, 14 pages.
Reed et al., "Apparatus and Method of Operating a Luminaire," Amendment filed Mar. 19, 2015, for U.S. Appl. No. 13/558,191, 20 pages.
Reed et al., "Long-Range Motion Detection for Illumination Control," Amendment filed Dec. 10, 2015, for U.S. Appl. No. 14/500,512, 20 pages.
Reed et al., "Long-Range Motion Detection for Illumination Control," Amendment filed Apr. 22, 2013, for U.S. Appl. No. 12/784,080, 17 pages.
Reed et al., "Long-Range Motion Detection for Illumination Control," Amendment filed Apr. 28, 2014, for U.S. Appl. No. 12/784,080, 20 pages.
Reed et al., "Long-Range Motion Detection for Illumination Control," Amendment filed Sep. 27, 2013, for U.S. Appl. No. 12/784,080, 20 pages.
Reed et al., "Long-Range Motion Detection for Illumination Control," U.S. Appl. No. 61/180,017, filed May 20, 2009, 32 pages.
Reed et al., "Low-Profile Pathway Illumination System," Amendment filed Jul. 29, 2011, for U.S. Appl. No. 12/437,472, 19 pages.
Reed et al., "Low-Profile Pathway Illumination System," U.S. Appl. No. 61/051,619, filed May 8, 2008, 25 pages.
Reed et al., "Remotely Adjustable Solid-State Lamp," Amendment filed Apr. 1, 2015, for U.S. Appl. No. 13/875,130, 14 pages.
Reed et al., "Remotely Adjustable Solid-State Lamp," Amendment filed Jul. 20, 2015, for U.S. Appl. No. 13/875,130, 15 pages.
Reed et al., "Remotely Adjustable Solid-State Lamp," U.S. Appl. No. 61/641,781, filed May 2, 2012, 65 pages.
Reed et al., "Systems and Methods That Employ Object Recognition," Amendment filed Jul. 7, 2015, for U.S. Appl. No. 13/411,321, 21 pages.
Reed et al., "Systems and Methods That Employ Object Recognition," Amendment filed Mar. 7, 2016, for U.S. Appl. No. 13/411,321, 16 pages.
Reed et al., "Systems and Methods That Employ Object Recognition," Amendment filed May 6, 2015, for U.S. Appl. No. 13/411,321, 20 pages.
Reed et al., "Systems and Methods That Employ Object Recognition," Amendment filed Nov. 21, 2014, for U.S. Appl. No. 13/411,321, 20 pages.
Reed, "Adjustable Output Solid-State Lighting Device," Amendment filed Jan. 8, 2016, for U.S. Appl. No. 13/707,123, 11 pages.
Reed, "Adjustable Output Solid-State Lighting Device," Amendment filed Apr. 2, 2015, for U.S. Appl. No. 13/707,123, 14 pages.
Reed, "Adjustable Output Solid-State Lighting Device," U.S. Appl. No. 61/567,308, filed Dec. 6, 2011, 49 pages.
Reed, "Ambient Light Control in Solid State Lamps and Luminaires," Amendment filed Jan. 29, 2015, for U.S. Appl. No. 14/609,168, 12 pages.
Reed, "Ambient Light Control in Solid State Lamps and Luminaires," U.S. Appl. No. 61/933,733, filed Jan. 30, 2014, 8 pages.
Reed, "Apparatus and Method of Energy Efficient Illumination Using Received Signals," Amendment filed Jan. 2, 2014, for U.S. Appl. No. 13/085,301, 26 pages.
Reed, "Apparatus and Method of Energy Efficient Illumination Using Received Signals," Amendment filed Jul. 23, 2014, for U.S. Appl. No. 13/085,301, 12 pages.
Reed, "Apparatus and Method of Energy Efficient Illumination," Amendment filed Apr. 2, 2013, for U.S. Appl. No. 12/784,093, 13 pages.

(56) References Cited

OTHER PUBLICATIONS

Reed, "Apparatus and Method of Energy Efficient Illumination," Amendment filed Apr. 4, 2013, for U.S. Appl. No. 12/784,091, 15 pages.
Reed, "Apparatus and Method of Energy Efficient Illumination," Amendment filed May 14, 2013, for U.S. Appl. No. 12/784,091, 9 pages.
Reed, "Apparatus and Method of Energy Efficient Illumination," Amendment filed Sep. 30, 2014, for U.S. Appl. No. 14/329,508, 18 pages.
Reed, "Apparatus and Method of Energy Efficient Illumination," U.S. Appl. No. 61/346,263, filed May 19, 2010, 67 pages.
Reed, "Apparatus and Method of Energy Efficient Illumination," U.S. Appl. No. 61/333,983, filed May 12, 2010, 57 pages.
Reed, "Electronic Control to Regulate Power for Solid-State Lighting and Methods Thereof," Amendment filed Dec. 15, 2014, for U.S. Appl. No. 12/619,535, 21 pages.
Reed, "Electronic Control to Regulate Power for Solid-State Lighting and Methods Thereof," Amendment filed May 23, 2017 for U.S. Appl. No. 14/806,500, 11 pages.
Reed, "Electronic Control to Regulate Power for Solid-State Lighting and Methods Thereof," Amendment filed May 24, 2013, for U.S. Appl. No. 12/619,535, 21 pages.
Reed, "Electronic Control to Regulate Power for Solid-State Lighting and Methods Thereof," Amendment filed May 27, 2014, for U.S. Appl. No. 12/619,535, 22 pages.
Reed, "Electronic Control to Regulate Power for Solid-State Lighting and Methods Thereof," Amendment filed Oct. 30, 2013, for U.S. Appl. No. 12/619,535, 5 pages.
Reed, "Electronic Control to Regulate Power for Solid-State and Methods Thereof," Response Under 37 CFR 1.116 filed Dec. 5, 2016 for U.S. Appl. No. 14/806,500, 12 pages.
Reed, "Electronic Control to Regulate Power for Solid-State Lighting and Methods Thereof," U.S. Appl. No. 61/115,438, filed Nov. 17, 2008, 51 pages.
Reed, "Electronic Control to Regulate Power for Solid-State Lighting and Methods Thereof," U.S. Appl. No. 61/154,619, filed Feb. 23, 2009, 62 pages.
Reed, "Electrostatic Discharge Protection for Luminaire," Amendment filed Jun. 17, 2013, for U.S. Appl. No. 13/212,074, 11 pages.
Reed, "High Efficiency Power Controller for Luminaire," Amendment filed Feb. 9, 2016, for U.S. Appl. No. 14/546,354, 11 pages.
Reed, "High Efficiency Power Controller for Luminaire," U.S. Appl. No. 61/905,699, filed Nov. 18, 2013, 5 pages.
Reed, "Inrush Current Limiter Circuit," U.S. Appl. No. 15/709,028, filed Sep. 19, 2017, 30 pages.
Reed, "Low Power Photocontrol for Luminaire," Amendment filed Jun. 13, 2016, for U.S. Appl. No. 14/844,944, 10 pages.
Reed, "Low Power Photocontrol for Luminaire," Notice of Allowance dated Aug. 24, 2016, for U.S. Appl. No. 14/844,944, 7 pages.
Reed, "Low Power Photocontrol for Luminaire," Office Action dated Apr. 27, 2016, for U.S. Appl. No. 14/844,944, 10 pages.
Reed, "Low Power Photocontrol for Luminaire," U.S. Appl. No. 62/137,666, filed Mar. 24, 2015, 36 pages.
Reed, "Luminaire With Atmospheric Electrical Activity Detection and Visual Alert Capabilities," U.S. Appl. No. 61/649,159, filed Aug. 28, 2012, 52 pages.
Reed, "Luminaire With Switch-Mode Converter Power Monitoring," U.S. Appl. No. 61/723,675, filed Nov. 7, 2012, 73 pages.
Reed, "Photocontrol for Luminaire Consumes Very Low Power," U.S. Appl. No. 61/849,841, filed Jul. 24, 2013, 41 pages.
Reed, "Resonant Network for Reduction of Flicker Perception in Solid State Lighting Systems," U.S. Appl. No. 61/527,029, filed Aug. 24, 2011, 41 pages.
Reed, "Solid State Hospitality Lamp," U.S. Appl. No. 61/692,619, filed Aug. 23, 2012, 32 pages.
Reed, "Solid State Lighting, Drive Circuit and Method of Driving Same," U.S. Appl. No. 61/640,963, filed May 1, 2012, 24 pages.
Reed, "Systems, Methods, and Apparatuses for Using a High Current Switching Device as a Logic Level Sensor," U.S. Appl. No. 61/764,395, filed Feb. 13, 2013, 48 pages.
Reed, "High Reliability Photocontrol Controls With 0 to 10 Volt Dimming Signal Line and Method," U.S. Appl. No. 62/507,730, filed May 17, 2017, 17 pages.
Reed, "Luminaire With Adjustable Illumination Pattern," U.S. Appl. No. 62/114,826, filed Feb. 11, 2015, 68 pages.
Renesas Electronics, "Zener Diodes for Surge Absorption—Applications of high-intensity LED," Apr. 2010, 1 page.
Tyco Electronics, "Circuit Protection," retrieved Jun. 10, 2011, retrieved from http://www.tycoelectronics.com/en/products/circuit-protection.html, 2 pages.
Written Opinion dated Nov. 11, 2014, for International Application No. PCT/US2014/047867, 5 pages.
Written Opinion, dated Dec. 13, 2010 for PCT/US2010/035649, 4 pages.
Written Opinion, dated Dec. 15, 2010 for PCT/US2010/035658, 3 pages.
Written Opinion, dated Dec. 28, 2010 for PCT/US2010/035651, 3 pages.
Written Opinion, dated Dec. 30, 2013 for PCT/US2013/058266, 8 pages.
Written Opinion, dated Feb. 27, 2013, for PCT/US2012/065476, 8 pages.
Written Opinion, dated Jan. 14, 2013, for PCT/US2012/052009, 5 pages.
Written Opinion, dated Jul. 9, 2009 for PCT/US2009/043171, 8 pages.
Written Opinion, dated Jun. 21, 2010 for PCT/US2009/064625, 5 pages.
Written Opinion, dated Nov. 19, 2013 for PCT/US2013/052092, 7 pages.
Written Opinion, dated Oct. 8, 2012 for PCT/US2012/033059, 3 pages.
Written Opinion, dated Sep. 30, 2011, for PCT/US2011/021359, 4 pages.
Notice of Allowance, dated Jan. 2, 2018, for U.S. Appl. No. 14/806,500, Reed, "Electronic Control to Regulate Power for Solid-State Lighting and Methods Thereof," 9 pages.
Notice of Allowance, dated Jan. 31, 2018, for U.S. Appl. No. 15/709,028, Reed, "Inrush Current Limiter Circuit," 31 pages.
Reed et al., "Switch Protection Apparatus and Operating Method Thereof," U.S. Appl. No. 62/669,883, filed May 10, 2018, 69 pages.

\* cited by examiner

OUTPUT RIPPLE REDUCTION FOR POWER CONVERTERS

BACKGROUND

Technical Field

The present disclosure generally relates to reduction of output ripple for power converters.

Description of the Related Art

Regulation concerning power factor correction for various electrically powered devices has become increasingly important. For low to medium power levels, a flyback converter is often used. By forcing the average input current to follow the input voltage, high power factor can be achieved. In many applications, such as lighting systems which utilize light emitting diode (LED) light sources, AC mains voltage of 110 or 220 VAC at 50 or 60 Hz line frequency is used to power the system. Single-stage power factor correction drivers are commonly used to convert AC line voltage into DC voltage for driving the load (e.g., a string of LEDs). For loads driven by DC, such as LEDs, it is often desirable to drive the loads at a constant current. For example, the luminosity of an LED is mainly determined by the magnitude of the driving current. Hence, to obtain a stable luminous output without flicker, LEDs should be driven by a constant current source.

Single-stage power factor correction drivers (e.g., flyback converters) may be used because such drivers are a relatively simple circuit which achieves both voltage conversion and power factor correction. However, the input power to the driver varies in correspondence to the AC mains voltage due to power factor correction. In particular, the input power ripple induces an output voltage ripple and an output current ripple, collectively referred to as output power ripple or output ripple. Consequently, utilizing a single-stage power factor correction driver to power a load such as LEDs directly leads to flickering at twice the line frequency (e.g., 100 Hz for a 50 Hz line frequency and 120 Hz for a 60 Hz line frequency).

In single-stage power factor correction drivers, there is a compromise between power factor and low frequency (e.g., 100 Hz, 120 Hz) ripple through the load. For example, to achieve a power factor higher than 90%, the peak-to-peak value of the load current ripple may be as high as 90% of the average DC value. This raises several problems. First, for DC lighting (e.g., LED lighting) applications, the ripple current may cause visible flickering. Second, it is difficult to achieve variable output power. When the average load current is reduced, the ripple current does not decrease proportionately and therefore the ripple current becomes more of a problem at reduced output power. In LED lighting applications, flickering is thus worse at reduced brightness. Third, the ripple current may degrade the lifespan of various devices, such as LEDs.

Providing a large capacitance (e.g., at least 1000 µF) at the output of the driver is one method conventionally used to reduce the output power ripple. However, providing a large capacitance at the output of the driver has drawbacks relating to size, costs, and reliability. Other solutions exist, such as providing two-stage conversion, but such solutions lead to an increase in size, a reduction in efficiency, an increase in cost, and/or more complex designs.

BRIEF SUMMARY

A circuit to reduce output ripple in a direct current (DC) power converter, the DC power converter including first and second output nodes which may provide DC power that may include an AC ripple having a ripple frequency ($f_{RIPPLE}$) which is a multiple of an AC power source which provides power to the power converter, may be summarized as including a transformer comprising: a core; a primary winding wrapped around at least a portion of the core a first number of times, the primary winding comprising a first primary terminal having a first polarity and a second primary terminal having a second polarity opposite the first polarity, the first primary terminal electrically coupled to the first output node of the DC power converter; and a secondary winding wrapped around at least a portion of the core a second number of times, the secondary winding comprising a first secondary terminal having the first polarity and a second secondary terminal having the second polarity, the first secondary terminal electrically coupled to a first load terminal of a load; and a first capacitor having a first capacitor terminal and a second capacitor terminal, the first capacitor terminal electrically coupled to the second primary terminal and the second secondary terminal of the transformer, and the second capacitor terminal electrically coupled to the second output node of the power converter. The primary winding may be wrapped around at least a portion of the core a first number of times, and the secondary winding may be wrapped around at least a portion of the core a second number of times, the second number of times may be equal to the first number of times. The first capacitor may include polymer electrolytic capacitor. The first capacitor may have a capacitance value which may be less than 300 microfarads (µF). The primary winding may have a first inductance value (L) and the secondary winding may have the first inductance value (L). The first capacitor may include a capacitance value (C), and the capacitance value (C) and the first inductance value (L) may satisfy:

$$f_{RIPPLE} = \frac{1}{2\pi\sqrt{LC}}.$$

The capacitance value may be between 50 and 250 microfarads (µF) and the first inductance value (L) may be between 5 and 35 millihenries (mH).

The circuit may further include a second capacitor having a first terminal electrically coupled to the first load terminal and a second terminal electrically coupled to the second output node of the power converter.

The circuit may further include a third capacitor having a first terminal electrically coupled to the first output node of the DC power converter and a second terminal electrically coupled to the second output node of the power converter. Each of the first capacitor, second capacitor and third capacitor may have a capacitance value which may be less than 300 microfarads (µF).

The circuit may further include a second capacitor having a first terminal electrically coupled to the first output node of the DC power converter and a second terminal electrically coupled to the second output node of the power converter.

The circuit may further include the load, wherein the load comprises a plurality of solid state light emitters.

The circuit may further include the DC power converter, wherein the DC power converter comprises an isolated single-stage flyback converter. The ripple frequency ($f_{RIPPLE}$) may be greater than or equal to 100 Hz and less than or equal to 120 Hz.

A solid state lighting system may be summarized as including a rectifier circuit which receives an alternating current (AC) signal and generates a rectified signal, the AC signal alternates at a source frequency ($f_{SOURCE}$); a DC/DC converter which receives the rectified signal at a first input node and generates a DC signal across a first output node and a second output node, the DC signal including an AC ripple component which has a ripple frequency ($f_{RIPPLE}$) that is twice the source frequency ($f_{SOURCE}$); a load comprising at least one solid state light source, the load including a first load terminal and a second load terminal; and a resonant circuit, comprising: a transformer comprising: a core; a primary winding wrapped around at least a portion of the core a first number of times, the primary winding comprising a first primary terminal having a first polarity and a second primary terminal having a second polarity opposite the first polarity, the first primary terminal electrically coupled to the first output node of the DC/DC converter; and a secondary winding wrapped around at least a portion of the core a second number of times, the secondary winding comprising a first secondary terminal having the first polarity and a second secondary terminal having the second polarity, the first secondary terminal electrically coupled to a first load terminal of the load; and a first capacitor having a first capacitor terminal and a second capacitor terminal, the first capacitor terminal electrically coupled to the second primary terminal and the second secondary terminal of the transformer, and the second capacitor terminal electrically coupled to the second output node of the power converter. The primary winding may be wrapped around at least a portion of the core a first number of times, and the secondary winding may be wrapped around at least a portion of the core a second number of times, the second number of times may be equal to the first number of times. The first capacitor may include a polymer electrolytic capacitor. The first capacitor may have a capacitance value which may be less than 300 microfarads (μF). The primary winding may have a first inductance value (L) and the secondary winding may have the first inductance value (L).

The first capacitor may include a capacitance value (C), and the capacitance value (C) and the first inductance value (L) my satisfy:

$$= \frac{1}{2\pi \sqrt{LC}}.$$

The capacitance value may be between 50 and 250 microfarads (μF) and the first inductance value (L) may be between 5 and 35 millihenries (mH).

The solid state lighting system may further include a second capacitor having a first terminal electrically coupled to the first load terminal and a second terminal electrically coupled to the second output node of the power converter.

The solid state lighting system may further include a third capacitor having a first terminal electrically coupled to the first output node of the DC power converter and a second terminal electrically coupled to the second output node of the power converter. Each of the first capacitor, second capacitor and third capacitor may have a capacitance value which may be less than 300 microfarads (μF).

The solid state lighting system may further include a second capacitor having a first terminal electrically coupled to the first output node of the DC power converter and a second terminal electrically coupled to the second output node of the power converter. The DC/DC converter may include an isolated single-stage flyback converter. The ripple frequency ($f_{RIPPLE}$) may be greater than or equal to 100 Hz and less than or equal to 120 Hz.

A circuit to reduce output ripple in a direct current (DC) power converter, the DC power converter providing DC power that may include an AC ripple having a ripple frequency ($f_{RIPPLE}$) which may be a multiple of an AC power source which may provide power to the power converter, may be summarized as including a transformer comprising: a core; a primary winding wrapped around at least a portion of the core a first number of times, the primary winding comprising a first primary terminal and a second primary terminal, the first primary terminal electrically coupled to an output node of the DC power converter; and a secondary winding wrapped around at least a portion of the core a second number of times, the secondary winding comprising a first secondary terminal and a second secondary terminal, the first secondary terminal electrically coupled to a load; and a capacitor electrically coupled to the second primary terminal and the second secondary terminal of the transformer. The primary winding may be wrapped around at least a portion of the core a first number of times, and the secondary winding may be wrapped around at least a portion of the core a second number of times, the second number of times may be equal to the first number of times. The capacitor may include polymer electrolytic capacitor. The capacitor may have a capacitance value which may be less than 300 microfarads (μF). The primary winding and the secondary winding may have the same inductance value (L).

The capacitor may include a capacitance value (C), and the capacitance value (C) and the inductance value (L) may satisfy:

$$f_{RIPPLE} = \frac{1}{2\pi \sqrt{LC}}.$$

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

DETAILED DESCRIPTION

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with computer systems, server computers, and/or communications networks have not been shown or described in detail to avoid unnecessarily obscuring descriptions of the implementations.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The headings and Abstract of the Disclosure provided herein are for convenience only and do not interpret the scope or meaning of the implementations.

One or more implementations of the present disclosure are directed reducing low frequency (e.g., 100 Hz, 120 Hz) output ripple of a power converter which receives input power from an AC power source (e.g., AC mains). To achieve this functionality, an output ripple reduction circuit may be electrically coupled between an output of a power converter and a load (e.g., one or more LEDs).

Figure 1:
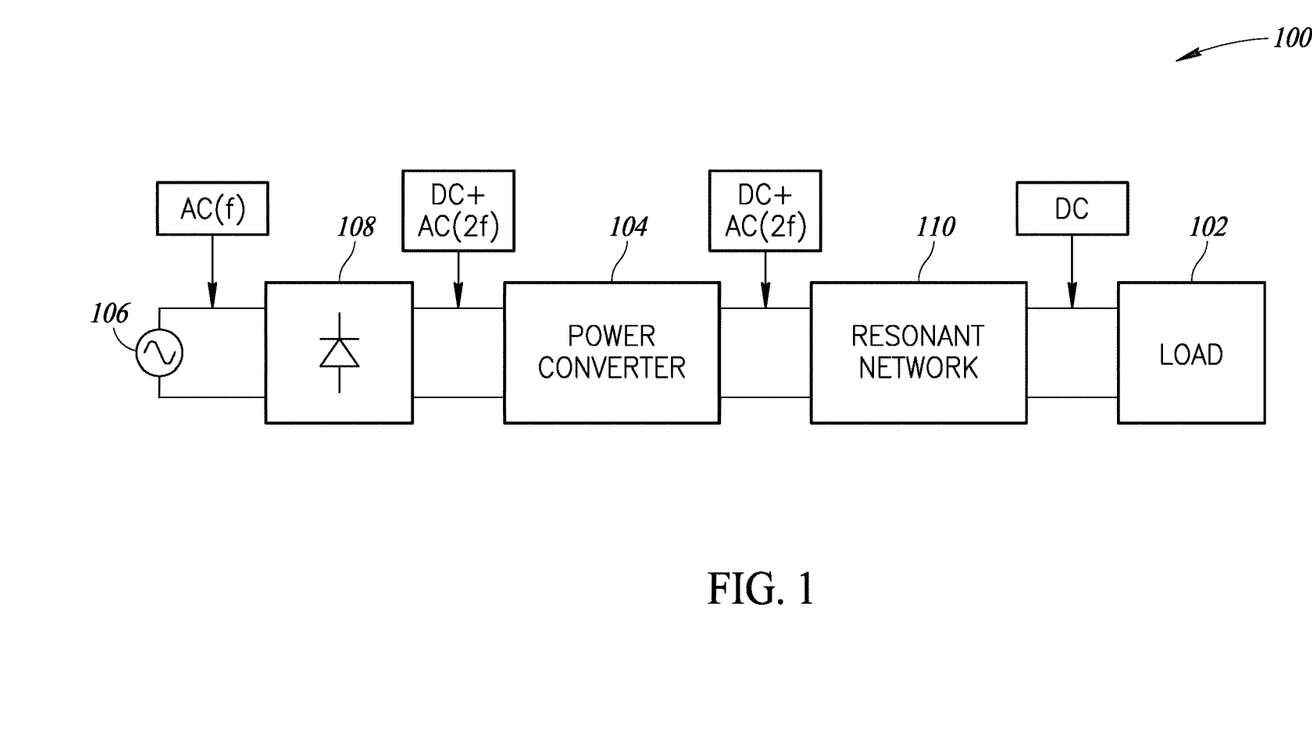
FIG. 1 is a schematic diagram of a system which includes an electrically powered load and a resonant network which reduces ripple provided to the load, according to one illustrated implementation.

FIG. 1 shows a system 100 which may be used to provide stable DC power to a load 102 which has minimal low frequency ripple. The term low frequency is used herein to refer to frequencies which are low multiples (e.g. 2×) of the frequency of the AC input power, rather than high frequencies (e.g., 50 kHz) which may be caused by switching of a switch-mode power supply, for example. The system 100 includes a single-stage power converter 104 which receives rectified power from an AC power source 106 via a rectifier 108. In particular, the AC power source 106 provides an AC signal having a frequency ($f_{MAINS}$) (e.g., 50 Hz, 60 Hz). The rectifier 108 rectifies the AC signal to provide substantially a DC signal (e.g., using a smoothing capacitor) which includes an AC ripple component that has a frequency ($f_{RIPPLE}$) equal to twice the frequency of the AC signal generated by the AC power source 106 due the rectification of the AC signal (i.e., $f_{RIPPLE}=2\times f_{MAINS}$). The power converter 104 converts the rectified voltage to a DC voltage and also provides power factor correction. The output provided by the power converter 106 may be a DC voltage with an AC ripple component at the ripple frequency ($f_{RIPPLE}$).

The power converter may include a single-stage power converter, such as a flyback converter, a boost converter, a buck-boost converter, a buck converter, a boost converter, etc. In at least some implementations, the load may include one or more solid state light emitters (e.g., LEDs).

To reduce or eliminate the AC ripple component of the output of the power converter 104, an output ripple reduction circuit or resonant network circuit 110 is electrically coupled between the output of the power converter and the load 102. The resonant network circuit 110 receives the DC power and AC ripple from the power converter 104 and outputs a DC power signal to the load 102 which has a significantly reduced or eliminated AC ripple component. Thus, relatively constant DC power is provided to the load 102 even when utilizing a single stage power converter. As discussed below with reference to FIG. 2, the resonant network circuit 110 significantly reduces the output ripple of the power converter 104 without requiring large capacitors (e.g., electrolytic capacitors with liquid or gel electrolytes) and without utilizing circuitry (e.g., dual stages) which significantly adds to the size, cost and/or complexity of the system 100.

Figure 2:
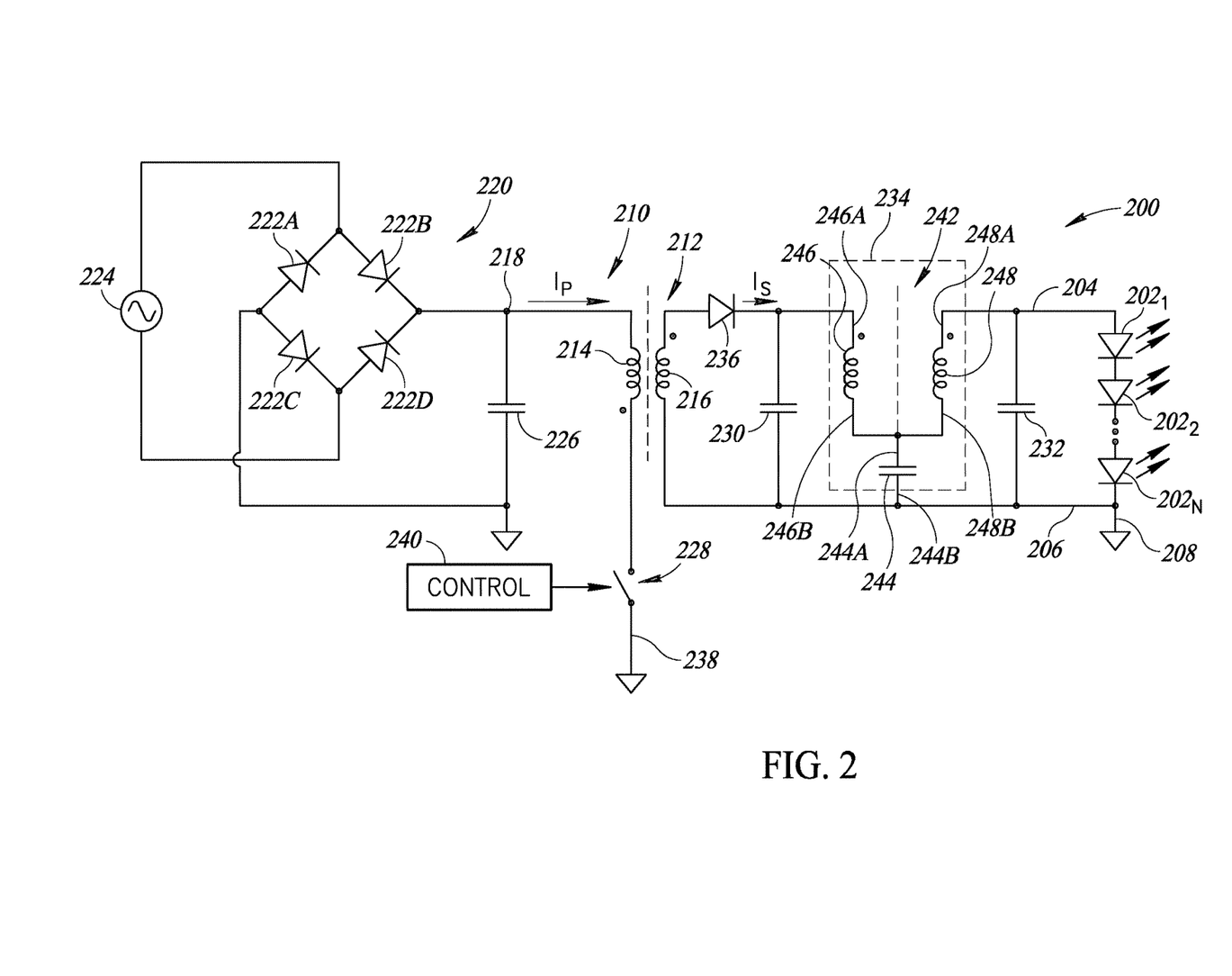
FIG. 2 is a schematic diagram of a solid state lighting system which includes a resonant network that reduces ripple provided to a string of LEDs, according to one illustrated implementation.

FIG. 2 shows a schematic diagram of a solid state lighting system 200 which includes an array of LEDs $202_1$-$202_N$ (e.g., 16 LEDs, 50 LEDs), collectively referred to herein as LEDs 202. The LEDs 202 are serially coupled together between a first load terminal or node 204 and a second load terminal or node 206. The second load terminal 206 may be electrically coupled to a reference or return node 208, optionally via a sense resistor (not shown) which may be used for feedback control.

The solid-state lighting system 200 includes a switching power converter in the form of a flyback converter 210 which includes a primary side and a secondary side that are galvanically isolated by a first transformer 212 having a primary winding 214 and a secondary winding 216. The primary winding 214 may have $N_P$ turns and the secondary winding 216 may have $N_S$ turns. $N_P$ may be equal to or different than $N_S$. The primary winding 214 of the flyback converter 210 is electrically coupled to an output node 218 of a rectifier 220 which comprises four diodes 222A-222D. The rectifier 220 rectifies an AC voltage supplied by an AC power source 224 (e.g., AC mains). An input capacitor 226 supplies a primary current $i_P$ when a switch 228 of the flyback converter 210 is turned on, as discussed below. The input capacitor 226 may have a value of 100 nF, for example.

The output voltage at the first load terminal 204 is provided by capacitors 230 and 232 and a resonant circuit 234, which are coupled in parallel to a series circuit including the secondary winding 216 of the first transformer 212 and a freewheeling diode 236. The capacitors 230 and 232 may each have capacitance value of 110 μF, for example. In at least some implementations, the capacitors 230 and 232 may have the same capacitance values as each other, or may have different capacitance values. In at least some implementations, at least one of the capacitors 230 and 232 may be optionally excluded from the system 200. Energy is transferred from the primary side to the secondary side of the first transformer 212 in the time intervals during which the primary current $i_P$ is switched off by the switch 228. During the same time interval, the capacitors 230 and 232 and resonant circuit 234 are charged via the freewheeling diode 236 by the induced current flowing through the secondary winding 216.

The primary winding 214 of the first transformer 212 is connected between the output node 218 of the rectifier 220 that provides the rectified line voltage and the switch 228 (e.g., MOSFET or other semiconductor switch) which controls current flow (primary current $i_P$) through the primary winding 214. In at least some implementations, the switch 228 may be a MOSFET coupled between the primary winding 214 and a reference or ground node 238. In at least some implementations, a sense resistor (not shown) may be connected between the switch and the reference node for control purposes.

When the switch 228 is switched on, the primary current $i_P$ increases and the energy stored in the primary winding 214 of the first transformer 212 increases. Since the freewheeling diode 236 is reverse biased during this phase of charging the inductance of the primary winding 214, the primary winding behaves like a single inductor. When the primary current $i_P$ is switched off by the switch 228, the freewheeling diode 236 becomes forward biased and the energy is transferred to the secondary winding 216, whereby the secondary current $i_S$ resulting from the voltage induced in the secondary winding charges the capacitors 230 and 232 and the resonant circuit 234.

A controller 240 is provided to control the timing of the opening and closing of the switch 228. As an example, the controller 240 may be an integrated circuit controller, such as a flyback controller integrated circuit model ICL8105 available from Infineon Technologies AG, Munich, Germany.

As noted above, the resonant circuit 234 is provided between the output of the flyback converter 210 (or other power converter) and the LEDs 202 to reduce or eliminate the low frequency (e.g., 100 Hz, 120 Hz) ripple which would otherwise be present on the output node of the power converter. The resonant circuit 234 includes a transformer 242 and a capacitor 244. The capacitor 244 may be an electrolytic polymer capacitor (e.g., aluminum polymer capacitor), and may have a capacitance value that is less than 300 microfarads (μF), for example. The transformer 242 has a first winding 246 and a second winding 248 each wrapped around at least a portion of a core in a dot phase opposition configuration (i.e., the first winding is wound around the core in the opposite direction as the second winding).

As shown in FIG. 2, the first winding 246 has a first terminal 246A having a first polarity and a second terminal 246B having a second polarity opposite the first polarity. Similarly, the second winding 248 has a first terminal 248A having the first polarity and a second terminal 248B having the second polarity. The first terminal 246A of the first winding 246 is electrically coupled to a first output node 250 of the power converter 210, and the first terminal 248A of the second winding 248 is electrically coupled to the first load terminal 204 of the LEDs 202. The respective second terminals 246A and 246B of the first and second windings 246 and 248, respectively, are coupled to a first terminal 244A of the capacitor 244. A second terminal 244B of the capacitor 244 is coupled to the reference or return node 206.

The primary winding 246 of the transformer 242 is wrapped around at least a portion of the core a first number of times, and the secondary winding 248 is wrapped around at least a portion of the core a second number of times. In at least some implementations, the second number of times equals the first number of times.

The inductance value (L) of each of the first winding 246 and the second winding 248 of the transformer 242 may be the equal to each other. In at least some implementations, inductance value for each of the first winding 246 and the second winding 248, and the capacitance of the capacitor 244, may be selected to satisfy the following equation:

$$f_{RIPPLE} = \frac{1}{2\pi\sqrt{LC}}$$

where L is the inductance of the first winding 246 and the inductance of the second winding 248, C is the capacitance of the capacitor 244, and $f_{RIPPLE}$ is the frequency of the ripple signal output by the power converter which, as discussed above, may be twice the frequency ($f_{MAINS}$) of the AC power source. Thus, the first winding 246 and the capacitor 244 form a series LC circuit, also referred to as a resonant circuit, tank circuit, or tuned circuit, with a resonant frequency $f_{RIPPLE}$. Similarly, the second winding 248 and the capacitor 244 also form a series LC circuit with a resonant frequency $f_{RIPPLE}$.

In at least some implementations, the first winding 246 and the second winding 248 each have an inductance value of 16 millihenries (mH), and the capacitor 244 has a capacitance value of 110 μF. In other implementations, the first winding 246 and the second winding 248 each have an inductance value of 8 mH, and the capacitor 244 has a capacitance value of 220 μF. In other implementations, the capacitor 244 may have a capacitance value between 50 and 250 microfarads μF and the windings 246 and 248 may each have an inductance value (L) between 5 and 35 mH, for example. It should be appreciated that other combinations of inductance and capacitance values may be selected dependent on the particular application requirements and the particular frequency of the ripple which is to be reduced.

In operation, as the first winding 246 conducts power into the capacitor 244, the second winding 248 bucks that power and is magnetized in the opposite direction. Thus, energy is stored in the first winding 246, second winding 248 and the capacitor 244. The energy stored in the first winding 246 is 180 degrees out of phase with the energy stored by the second winding 248. The energy stored by the capacitor 244 is 90 degrees out of phase with both the first winding 246 and the second winding 248.

The sum total of the resonant circuit 234 and the capacitors 230 and 232 is a constant current output provided to the LEDs 202 with an input signal that is highly varying at a constant frequency (i.e., varying at the ripple frequency ($f_{RIPPLE}$)). As discussed above, such functionality may be achieved using relatively small capacitors (e.g., less than 300 μF, less than 200 μF, less than 100 μF).

The foregoing detailed description has set forth various implementations of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one implementation, the present subject matter may be implemented via Application Specific Integrated Circuits (ASICs). However, those skilled in the art will recognize that the implementations disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

Those of skill in the art will recognize that many of the methods or algorithms set out herein may employ additional acts, may omit some acts, and/or may execute acts in a different order than specified.

In addition, those skilled in the art will appreciate that the mechanisms taught herein are capable of being distributed as a program product in a variety of forms, and that an illustrative implementation applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory.

The various implementations described above can be combined to provide further implementations. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet, including but not limited to U.S. Provisional Patent Application No. 61/052,924, filed May 13, 2008; U.S. Pat. No. 8,926,138, issued Jan. 6, 2015; PCT Publication No. WO2009/140141, published Nov. 19, 2009; U.S. Provisional Patent Application No. 61/051,619, filed May 8, 2008; U.S. Pat. No. 8,118,456, issued Feb. 21, 2012; PCT Publication No. WO2009/137696, published Nov. 12, 2009; U.S. Provisional Patent Application No. 61/088,651, filed Aug. 13, 2008; U.S. Pat. No. 8,334,640, issued Dec. 18, 2012; U.S. Provisional Patent Application No. 61/115,438, filed Nov. 17, 2008; U.S. Provisional Patent Application No. 61/154,619, filed Feb. 23, 2009; U.S. Patent Publication No. 2010/0123403, published May 20, 2010; U.S. Patent Publication No. 2016/0021713, published Jan. 21, 2016; PCT Publication No. WO2010/057115, published May 20, 2010; U.S. Provisional Patent Application No. 61/174,913, filed May 1, 2009; U.S. Pat. No. 8,926,139, issued Jan. 6, 2015; PCT Publication No. WO2010/127138, published Nov. 4, 2010; U.S. Provisional Patent Application No. 61/180,017, filed May 20, 2009; U.S. Pat. No. 8,872,964, issued Oct. 28, 2014; U.S. Patent Publication No. 2015/0015716, published Jan. 15, 2015; PCT Publication No. WO2010/135575, published Nov. 25, 2010; U.S. Provisional Patent Application No. 61/229,435, filed Jul. 29, 2009; U.S. Patent Publication No. 2011/0026264, published Feb. 3, 2011; U.S. Provisional Patent Application No. 61/295,519, filed Jan. 15, 2010; U.S. Provisional Patent Application No. 61/406,490, filed Oct. 25, 2010; U.S. Pat. No. 8,378,563, issued Feb. 19, 2013; PCT Publication No. WO2011/088363, published Jul. 21, 2011; U.S. Provisional Patent Application No. 61/333,983, filed May 12, 2010; U.S. Pat. No. 8,541,950, issued Sep. 24, 2013; PCT Publication No. WO2010/135577, published Nov. 25, 2010; U.S. Provisional Patent Application No. 61/346,263, filed May 19, 2010; U.S. Pat. No. 8,508,137, issued Aug. 13, 2013; U.S. Pat. No. 8,810,138, issued Aug. 19, 2014; U.S. Pat. No. 8,987,992, issued Mar. 24, 2015; PCT Publication No. WO2010/135582, published Nov. 25, 2010; U.S. Provisional Patent Application No. 61/357,421, filed Jun. 22, 2010; U.S. Pat. No. 9,241,401, granted Jan. 19, 2016; PCT Publication No. WO2011/163334, published Dec. 29, 2011; U.S. Pat. No. 8,901,825, issued Dec. 2, 2014; U.S. Patent Publication No. 2015/0084520, published Mar. 26, 2015; PCT Publication No. WO2012/142115, published Oct. 18, 2012; U.S. Pat. No. 8,610,358, issued Dec. 17, 2013; U.S. Provisional Patent Application No. 61/527,029, filed Aug. 24, 2011; U.S. Pat. No. 8,629,621, issued Jan. 14, 2014; PCT Publication No. WO2013/028834, published Feb. 28, 2013; U.S. Provisional Patent Application No. 61/534,722, filed Sep. 14, 2011; U.S. Pat. No. 9,312,451, issued Apr. 12, 2016; PCT Publication No. WO2013/040333, published Mar. 21, 2013; U.S. Provisional Patent Application No. 61/567,308, filed Dec. 6, 2011; U.S. Pat. No. 9,360,198, issued Jun. 7, 2016; U.S. Provisional Patent Application No. 61/561,616, filed Nov. 18, 2011; U.S. Patent Publication No. 2013/0141010, published Jun. 6, 2013; PCT Publication No. WO2013/074900, published May 23, 2013; U.S. Provisional Patent Application No. 61/641,781, filed May 2, 2012; U.S. Patent Publication No. 2013/0293112, published Nov. 7, 2013; U.S. Patent Publication No. 2013/0229518, published Sep. 5, 2013; U.S. Provisional Patent Application No. 61/640,963, filed May 1, 2012; U.S. Patent Publication No. 2013/0313982, published Nov. 28, 2013; U.S. Patent Publication No. 2014/0028198, published Jan. 30, 2014; U.S. Patent Publication No. 2016/0037605, published Feb. 4, 2016; PCT Publication No. WO2014/018773, published Jan. 30, 2014; U.S. Provisional Patent Application No. 61/723,675, filed Nov. 7, 2012; U.S. Pat. No. 9,301,365, issued Mar. 29, 2016; U.S. Provisional Patent Application No. 61/692,619, filed Aug. 23, 2012; U.S. Patent Publication No. 2014/0055990, published Feb. 27, 2014; U.S. Provisional Patent Application No. 61/694,159, filed Aug. 28, 2012; U.S. Pat. No. 8,878,440, issued Nov. 4, 2014; U.S. Patent Publication No. 2014/0062341, published Mar. 6, 2014; U.S. Patent Publication No. 2015/0077019, published Mar. 19, 2015; PCT Publication No. WO2014/039683, published Mar. 13, 2014; U.S. Provisional Patent Application No. 61/728,150, filed Nov. 19, 2012; U.S. Patent Publication No. 2014/0139116, published May 22, 2014; U.S. Pat. No. 9,433,062, issued Aug. 30, 2016; PCT Publication No. WO2014/078854, published May 22, 2014; U.S. Provisional Patent Application No. 61/764,395, filed Feb. 13, 2013; U.S. Pat. No. 9,288,873, issued Mar. 15, 2016; U.S. Provisional Patent Application No. 61/849,841, filed Jul. 24, 2013; U.S. Patent Publication No. 2015/0028693, published Jan. 29, 2015; PCT Publication No. WO2015/013437, published Jan. 29, 2015; U.S. Provisional Patent Application No. 61/878,425, filed Sep. 16, 2013; U.S. Patent Publication No. 2015/0078005, published Mar. 19, 2015; PCT Publication No. WO2015/039120, published Mar. 19, 2015; U.S. Provisional Patent Application No. 61/933,733, filed Jan. 30, 2014; U.S. Pat. No. 9,185,777, issued Nov. 10, 2015; PCT Publication No. WO2015/116812, published Aug. 6, 2015; U.S. Provisional Patent Application No. 61/905,699, filed Nov. 18, 2013; U.S. Pat. No. 9,414,449, issued Aug. 9, 2016; U.S. Provisional Patent Application No. 62/068,517, filed Oct. 24, 2014; U.S. Provisional Patent Application No. 62/183,505, filed Jun. 23, 2015; U.S. Pat. No. 9,445,485, issued Sep. 13, 2016; PCT Publication No. WO2016/064542, published Apr. 28, 2016; U.S. Provisional Patent Application No. 62/082,463, filed Nov. 20, 2014; U.S. Publication No. 2016/0150369, published May 26, 2016; PCT Publication No. WO2016/081071, published May 26, 2016; U.S. Provisional Patent Application No. 62/057,419, filed Sep. 30, 2014; U.S. Publication No. 2016/0095186, published Mar. 31, 2016; PCT Publication No. WO2016/054085, published Apr. 7, 2016; U.S. Provisional Patent Application No. 62/114,826, filed Feb. 11, 2015; U.S. Non-provisional patent application Ser. No. 14/939,856, filed Nov. 12, 2015; U.S. Provisional Patent Application No. 62/137,666, filed Mar. 24, 2015; U.S. Non-provisional patent application Ser. No. 14/994,569, filed Jan. 13, 2016; U.S. Non-provisional patent application Ser. No. 14/844,944, filed Sep. 3, 2015; U.S. Provisional Patent Application No. 62/208,403, filed Aug. 21, 2015; U.S. Non-provisional patent application Ser. No. 15/238,129, filed Aug. 16, 2016; U.S. Provisional Patent Application No. 62/264,694, filed Dec. 8, 2015; U.S. Provisional Patent Application No. 62/327,939, filed Apr. 26, 2016; U.S. Provisional Patent Application No. 62/379,037, filed Aug. 24, 2016; and U.S. Provisional Patent Application No. 62/397,713, filed on Sep. 21, 2016 and titled "INRUSH CURRENT LIMITER CIRCUIT" are incorporated herein by reference, in their entirety. Aspects of the implementations can be modified, if necessary, to employ systems, circuits and concepts of the various patents, applications and publications to provide yet further implementations.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. A circuit to reduce output ripple in a direct current (DC) power converter, the DC power converter comprising first and second output nodes which provides DC power that includes an AC ripple having a ripple frequency ($f_{RIPPLE}$) which is a multiple of an AC power source which provides power to the DC power converter, the circuit comprising:
    a transformer comprising:
        a core;
        a primary winding wrapped around at least a portion of the core a first number of times, the primary winding comprising a first primary terminal having a first polarity and a second primary terminal having a second polarity opposite the first polarity, the first primary terminal electrically coupled to the first output node of the DC power converter; and
        a secondary winding wrapped around at least a portion of the core a second number of times, the secondary winding comprising a first secondary terminal having the first polarity and a second secondary terminal having the second polarity, the first secondary terminal electrically coupled to a first load terminal of a load; and
    a first capacitor having a first capacitor terminal and a second capacitor terminal, the first capacitor terminal electrically coupled to the second primary terminal and the second secondary terminal of the transformer, and the second capacitor terminal electrically coupled to the second output node of the DC power converter.

2. The circuit of claim 1 wherein the second number of times equal to the first number of times.

3. The circuit of claim 1 wherein the first capacitor comprises a polymer electrolytic capacitor.

4. The circuit of claim 1 wherein the first capacitor has a capacitance value which is less than 300 microfarads (μF).

5. The circuit of claim 1 wherein the primary winding has a first inductance value (L) and the secondary winding has the first inductance value (L).

6. The circuit of claim 5 wherein the first capacitor comprises a capacitance value (C), and the capacitance value (C) and the first inductance value (L) satisfy:

$$f_{RIPPLE} = \frac{1}{2\pi\sqrt{LC}}.$$

7. The circuit of claim 6 wherein the capacitance value is between 50 and 250 microfarads (μF) and the first inductance value (L) is between 5 and 35 millihenries (mH).

8. The circuit of claim 1, further comprising:
    a second capacitor having a first terminal electrically coupled to the first load terminal and a second terminal electrically coupled to the second output node of the DC power converter.

9. The circuit of claim 8, further comprising:
    a third capacitor having a first terminal electrically coupled to the first output node of the DC power converter and a second terminal electrically coupled to the second output node of the DC power converter.

10. The circuit of claim 9 wherein each of the first capacitor, second capacitor and third capacitor, individually, has a capacitance value which is less than 300 microfarads (μF).

11. The circuit of claim 1, further comprising:
    a second capacitor having a first terminal electrically coupled to the first output node of the DC power converter and a second terminal electrically coupled to the second output node of the DC power converter.

12. The circuit of claim 1, wherein the load comprises a plurality of solid state light emitters.

13. The circuit of claim 1, wherein the DC power converter comprises an isolated single-stage flyback converter.

14. The circuit of claim 1 wherein the ripple frequency ($f_{RIPPLE}$) is greater than or equal to 100 Hz and less than or equal to 120 Hz.

15. A solid state lighting system, comprising:
    a rectifier circuit which receives an alternating current (AC) signal and generates a rectified signal, the AC signal alternates at a source frequency ($f_{SOURCE}$);
    a DC/DC converter which receives the rectified signal at a first input node and generates a DC signal across a first output node and a second output node, the DC signal including an AC ripple component which has a ripple frequency ($f_{RIPPLE}$) that is twice the source frequency ($f_{SOURCE}$);
    a load comprising at least one solid state light source, the load including a first load terminal and a second load terminal; and
    a resonant circuit, comprising:
        a transformer comprising:
            a core;
            a primary winding wrapped around at least a portion of the core a first number of times, the primary winding comprising a first primary terminal having a first polarity and a second primary terminal having a second polarity opposite the first polarity, the first primary terminal electrically coupled to the first output node of the DC/DC converter; and
            a secondary winding wrapped around at least a portion of the core a second number of times, the secondary winding comprising a first secondary terminal having the first polarity and a second secondary terminal having the second polarity, the first secondary terminal electrically coupled to a first load terminal of the load; and
        a first capacitor having a first capacitor terminal and a second capacitor terminal, the first capacitor terminal electrically coupled to the second primary terminal and the second secondary terminal of the transformer, and the second capacitor terminal electrically coupled to the second output node of the DC/DC power converter.

16. The solid state lighting system of claim 15 wherein the second number of times equal to the first number of times.

17. The solid state lighting system of claim 15 wherein the first capacitor comprises a polymer electrolytic capacitor.

18. The solid state lighting system of claim 15 wherein the first capacitor has a capacitance value which is less than 300 microfarads (μF).

19. The solid state lighting system of claim 15 wherein the primary winding has a first inductance value (L) and the secondary winding has the first inductance value (L).

20. The solid state lighting system of claim 19 wherein the first capacitor comprises a capacitance value (C), and the capacitance value (C) and the first inductance value (L) satisfy:

$$= \frac{1}{2\pi\sqrt{LC}}.$$

21. The solid state lighting system of claim 20 wherein the capacitance value is between 50 and 250 microfarads (μF) and the first inductance value (L) is between 5 and 35 millihenries (mH).

22. The solid state lighting system of claim 15, further comprising:
a second capacitor having a first terminal electrically coupled to the first load terminal and a second terminal electrically coupled to the second output node of the power DC/DC converter.

23. The solid state lighting system of claim 22, further comprising:
a third capacitor having a first terminal electrically coupled to the first output node of the DC/DC power converter and a second terminal electrically coupled to the second output node of the DC/DC power converter.

24. The solid state lighting system of claim 23 wherein each of the first capacitor, second capacitor and third capacitor, individually, has a capacitance value which is less than 300 microfarads (μF).

25. The solid state lighting system of claim 15, further comprising:
a second capacitor having a first terminal electrically coupled to the first output node of the DC/DC power converter and a second terminal electrically coupled to the second output node of the DC/DC power converter.

26. The solid state lighting system of claim 15 wherein the DC/DC converter comprises an isolated single-stage flyback converter.

27. The solid state lighting system of claim 15 wherein the ripple frequency ($f_{RIPPLE}$) is greater than or equal to 100 Hz and less than or equal to 120 Hz.

28. A circuit to reduce output ripple in a direct current (DC) power converter, the DC power converter provides DC power that includes an AC ripple having a ripple frequency ($f_{RIPPLE}$) which is a multiple of an AC power source which provides power to the power DC converter, the circuit comprising:
a transformer comprising:
a core;
a primary winding wrapped around at least a portion of the core a first number of times, the primary winding comprising a first primary terminal and a second primary terminal, the first primary terminal electrically coupled to an output node of the DC power converter; and
a secondary winding wrapped around at least a portion of the core a second number of times, the secondary winding comprising a first secondary terminal and a second secondary terminal, the first secondary terminal electrically coupled to a load; and
a capacitor having a first capacitor terminal electrically coupled to the second primary terminal and the second secondary terminal of the transformer, wherein the second primary terminal and the second secondary terminal have a same polarity.

29. The circuit of claim 28 wherein the second number of times equal to the first number of times.

30. The circuit of claim 28 wherein the capacitor comprises a polymer electrolytic capacitor.

31. The circuit of claim 28 wherein the capacitor has a capacitance value which is less than 300 microfarads (μF).

32. The circuit of claim 28 wherein the primary winding and the secondary winding have the same inductance value (L).

33. The circuit of claim 32 wherein the capacitor comprises a capacitance value (C), and the capacitance value (C) and the inductance value (L) satisfy:

$$f_{RIPPLE} = \frac{1}{2\pi\sqrt{LC}}.$$

* * * * *